United States Patent [19]

Ogue et al.

[11] Patent Number: 5,622,811
[45] Date of Patent: Apr. 22, 1997

[54] METHOD FOR FORMING RESIN ARTICLES

[75] Inventors: Yousuke Ogue, Amagasaki; Hideho Ariyoshi, Hirakata, both of Japan

[73] Assignee: Matsushita Electric Industrial Co., Ltd., Osaka-fu, Japan

[21] Appl. No.: 386,053

[22] Filed: Feb. 7, 1995

[30] Foreign Application Priority Data

Feb. 7, 1994 [JP] Japan .................................. 6-013258

[51] Int. Cl.$^6$ .............................. G03C 9/08; B29C 35/08
[52] U.S. Cl. ........................ 430/269; 430/320; 430/394; 430/945; 264/401; 425/174.4
[58] Field of Search ............................. 430/270.1, 320, 430/269, 394, 945; 264/401; 425/174.4

[56] References Cited

U.S. PATENT DOCUMENTS 5,094,935  3/1992  Vassiliou et al. ...................... 430/269
5,174,943  12/1992  Hull ........................................ 264/401

Primary Examiner—John S. Chu
Attorney, Agent, or Firm—Wenderoth, Lind & Ponack

[57] ABSTRACT

In a method and apparatus for forming a resin article by forming a film of photosetting resin liquid on a surface of a workpiece, the workpiece is held in a direction to keep its axis approximately in a horizontal posture. The workpiece is rotated about the axis to thereby form the film of the resin liquid on the surface of the workpiece. The laser beam supplied from above the workpiece is emitted toward the film. At least one of the workpiece and the laser beam is relatively moved continuously or intermittently along the axis.

6 Claims, 4 Drawing Sheets

METHOD FOR FORMING RESIN ARTICLES

BACKGROUND OF THE INVENTION

The present invention relates to a method and an apparatus for forming laminated resin articles by way of casting of laser beam or plasma or electron beam onto photosetting resin liquid or thermosetting resin liquid.

A resin article has been obtained by casting laser beam onto photosetting resin liquid. In a conventional arrangement, as shown in FIG. 6, a resin article on an elevator stage 3 is formed through lamination of photosetting resin. The elevator stage 3 is set in a liquid bath 2 containing photosetting resin liquid 1. More specifically, when a first layer of the resin article 4 is to be formed, the elevator stage 3 is held at an upper position in the vicinity of the liquid level of the resin liquid 1 by a driving mechanism 5. Laser beam 8 supplied via a laser beam controller 7 from a laser oscillator 6 partially scans in two dimensions and hardens a part of the resin liquid 1 on the elevator stage 3. Since the driving mechanism 5 lowers the elevator stage 3 by 0.1–0.2 mm intervals, the laser beam 8 sequentially sets a second layer and succeeding layers of resin over the first layer. The laminated resin article 4 is produced in this manner.

In the prior art, if the to-be-laminated article 4 is, for example, in the shape of a screw as in FIG. 7, the target shape with a plurality of vanes 9 cannot be efficiently obtained although the laser beam scans in two dimensions in directions of arrows.

When a thin portion of the article 4 assumes a vertical posture as indicated in FIG. 8A, a step difference 10 generated between the layers is small enough to form the resin article 4 relatively accurately. In contrast, when a thin portion of the resin article 4 is inclined as shown in FIG. 8B, the step difference 10 appears clearly, whereby the formed resin article with the screw-like shape has many step differences 10 as is illustrated in FIG. 9.

SUMMARY OF THE INVENTION

The object of the present invention is therefore to provide a method and an apparatus for relatively highly accurately and efficiently forming even an article with a curved surface such as a screw or the like through lamination of resin.

In accomplishing these and other objects, according to one aspect of the present invention, there is provided a method for forming a resin article by forming a film of photosetting resin liquid or thermosetting resin liquid on a surface of a workpiece, which comprises:

a step of holding the workpiece in a direction to keep its axis approximately in a horizontal posture;

a step of rotating the workpiece about the axis to thereby form the film of the liquid on the surface of the workpiece;

a step of emitting a beam supplied from above the workpiece to the film for setting the rein liquid; and a step of relatively moving at least one of the workpiece and the beam continuously or intermittently along the axis.

According to another aspect of the present invention, there is provided an apparatus for forming a resin article by forming a film of photosetting resin liquid or thermosetting resin liquid on a surface of a workpiece, which comprises:

a liquid bath containing the liquid;

a holding mechanism for holding the workpiece at least partially sinking in the resin liquid, in a direction to keep its axis approximately in a horizontal posture;

a rotating/driving mechanism for rotating the workpiece about the axis so as to form the film of the resin liquid on the surface of the workpiece;

a beam source set above the liquid bath for emitting a beam to set the film; and a beam scanning means for relatively moving at least one of the workpiece and the beam along the axis.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENT

Figure 1:
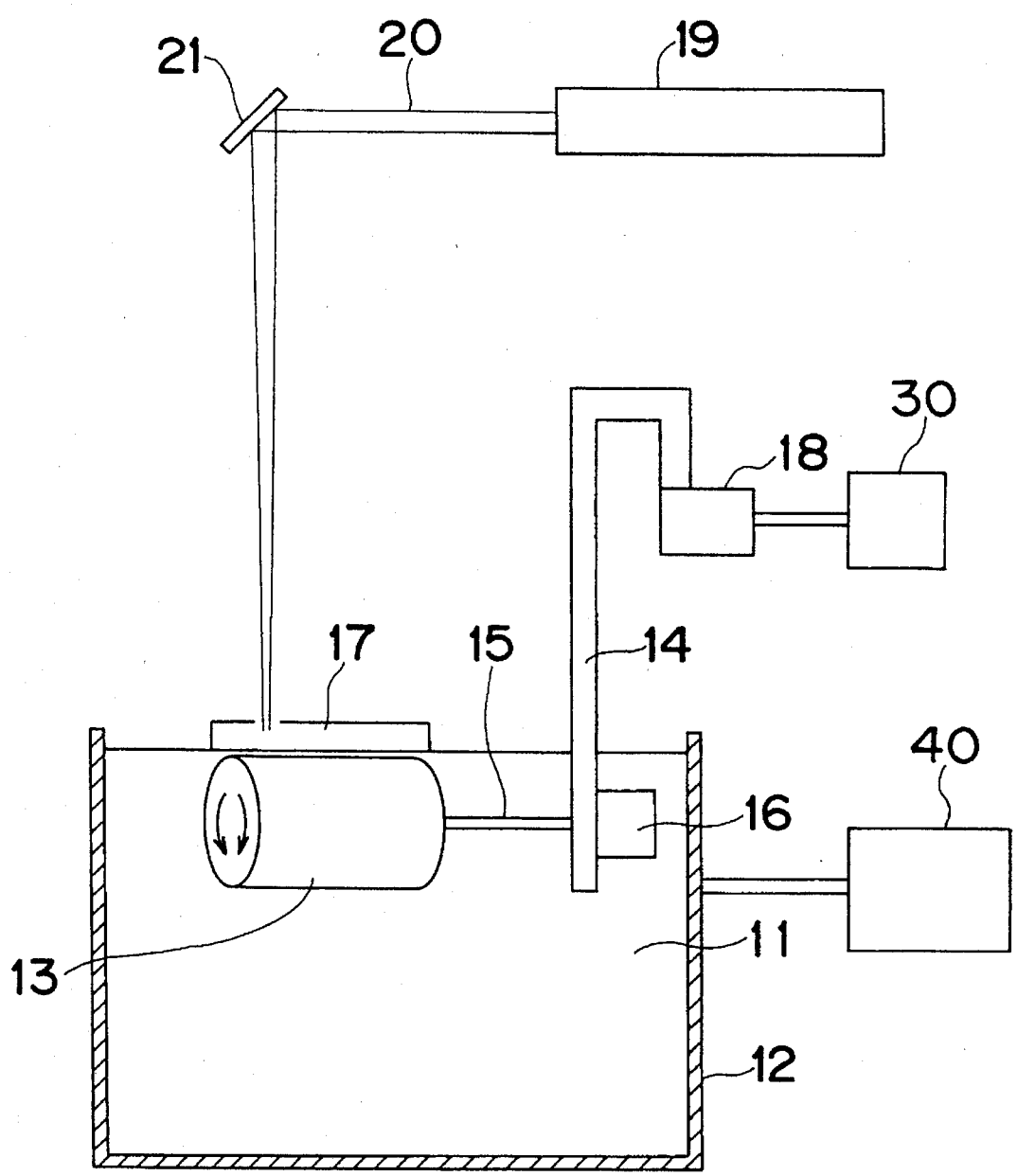
FIG. 1 is a schematic side view of a forming apparatus of a resin article in one embodiment of the present invention.

Before the description of the present invention proceeds, it is to be noted that like parts are designated by like reference numerals throughout the accompanying drawings.

Preferred embodiments of the present invention will be depicted with reference to the corresponding drawings.

Referring to FIG. 1 showing a forming apparatus of resin articles, a column-shaped workpiece 13 is set inside a liquid bath 12 containing a photosetting resin liquid 11. The workpiece 13 can have any desired shape and examples of workpiece 13 are a grooved cam, a turbine shaft with complicated cooling water holes, etc. Although the workpiece 13 sinks in the resin liquid 11 in the vicinity of the liquid surface thereof, the workpiece 13 is supported by a rotary shaft 15 of a workpiece holding mechanism 14 so as to keep the axis of the workpiece 13 almost in the horizontal direction. The rotary shaft 15 is coupled with a rotating/driving mechanism 16 which rotates the workpiece 13 about the axis. The axis of the workpiece 13 is, for example, a rotary axis of the workpiece 13 when the workpiece 13 is rotated. A film of the resin liquid 11 is formed on the surface of the workpiece 13 during the axial rotation of the workpiece 13. A contact plate, namely, blade 17 is set over the liquid bath 12 in a manner to be movable up and down freely. The blade 17 comes in touch with the film formed on the workpiece 13 to thereby to control the thickness of the film to a predetermined value mechanically. A lift mechanism 18 connected to the workpiece holding mechanism 14 sequentially lowers the workpiece holding mechanism 14 by distance corresponding to the thickness of one layer each time one resin-set layer of the resin is formed on the surface of the workpiece 13.

Laser beam 20 emitted from a laser oscillator 19 above the liquid bath 12 continuously or intermittently scans the resin film on the surface of the workpiece 13 in a direction parallel to the axis of the workpiece 13 by a scanning device. At this time, a laser beam controller 21 constituted of a galvano mirror or the like is used as the scanning device of the laser beam 20. As a result of this scanning, the resin film formed on the surface of the workpiece 13 is set within a predetermined area thereof. The scanning pitch is determined with the diameter of spots of the laser beam 20 when the laser beam 20 is cast onto the film with the rotating speed of the workpiece 13, etc. taken into consideration.

The resin film formed on the surface of the workpiece 13 as the workpiece 13 is axially rotated tends to be too thick because of the viscosity of the resin liquid 11. Therefore, the blade 17 is employed to smooth the film. The setting position, shape, and the like of the blade 17 may be suitably selected corresponding to the viscosity of the resin liquid 11. The blade 17 is lowered by distance intervals corresponding to the film thickness by the lift mechanism 18 each time one layer is set.

Figure 2:
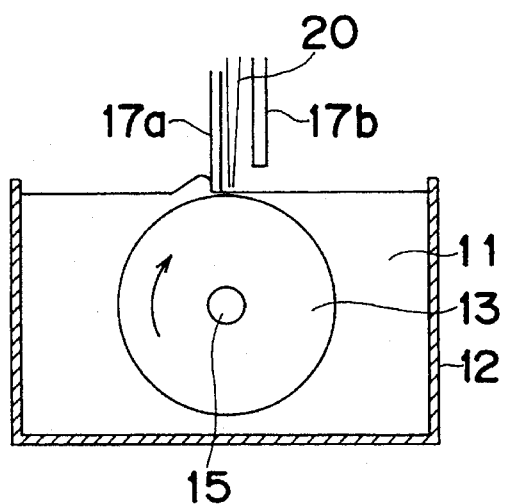
FIG. 2 is a schematic partial side view of the forming apparatus of FIG. 1.

As shown in FIG. 2, the blade 17 is set at the upstream side, i.e., the left side of the axis of rotation of the workpiece 13, controlling the film thickness immediately before the resin film is set. In the constitution of FIG. 2, on the assumption that the rotating direction of the workpiece 13 may be changed, two blades 17a, 17b are arranged via the laser beam 20, that is, in front of and behind a position where the laser beam 20 is cast onto the workpiece 13. The blades 17a, 17b are alternatively used. Concretely, when the rotation of the workpiece 13 is changed in direction, the operating blade is switched to the one at the left side of the axis of rotation of the workpiece 13, with the other blade at the right side (17b in the example of FIG. 2) being retracted so as not to come in touch with the resin film.

Figure 3:
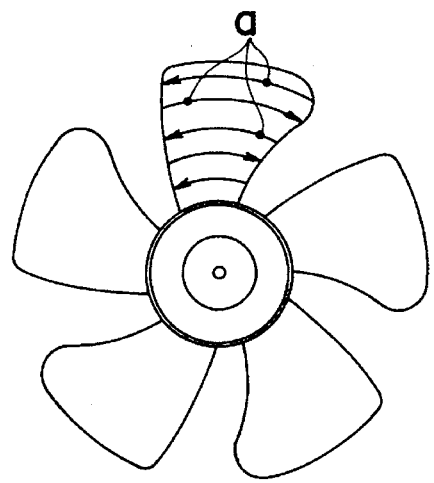
FIG. 3 is an explanatory diagram of laser beam starting points to set resin in a further embodiment of the present invention.

The direction of the axial rotation of the workpiece 13 may be inverted every time one layer is set or a plurality of layers are set. The direction in which the setting occurs can be changed by changing the rotating direction of the workpiece 13. If a starting point (a) of the setting is shifted as shown in FIG. 3, the residual stress in a laminated resin article is prevented from concentrating at one point, whereby the forming accuracy is enhanced.

Figure 4:
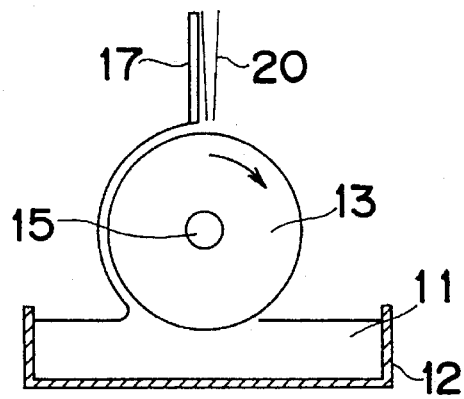
FIG. 4 is a schematic partial side view of a forming apparatus of a resin article in a different embodiment of the present invention.

Although it depends on the viscosity of the resin liquid 11, the resin film may be formed on the surface of the workpiece 13 over the liquid bath 12 as in FIG. 4 or without the liquid bath 12. The resin film is controlled by the blade 17 to a thickness corresponding to one layer.

Figure 5:
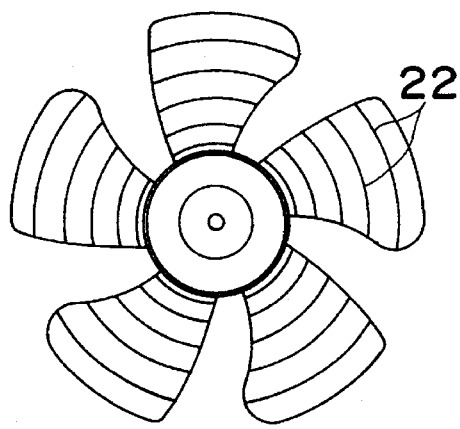
FIG. 5 is a plan view of the laminated structure of a resin article obtained in accordance with the embodiment.
Figure 6:
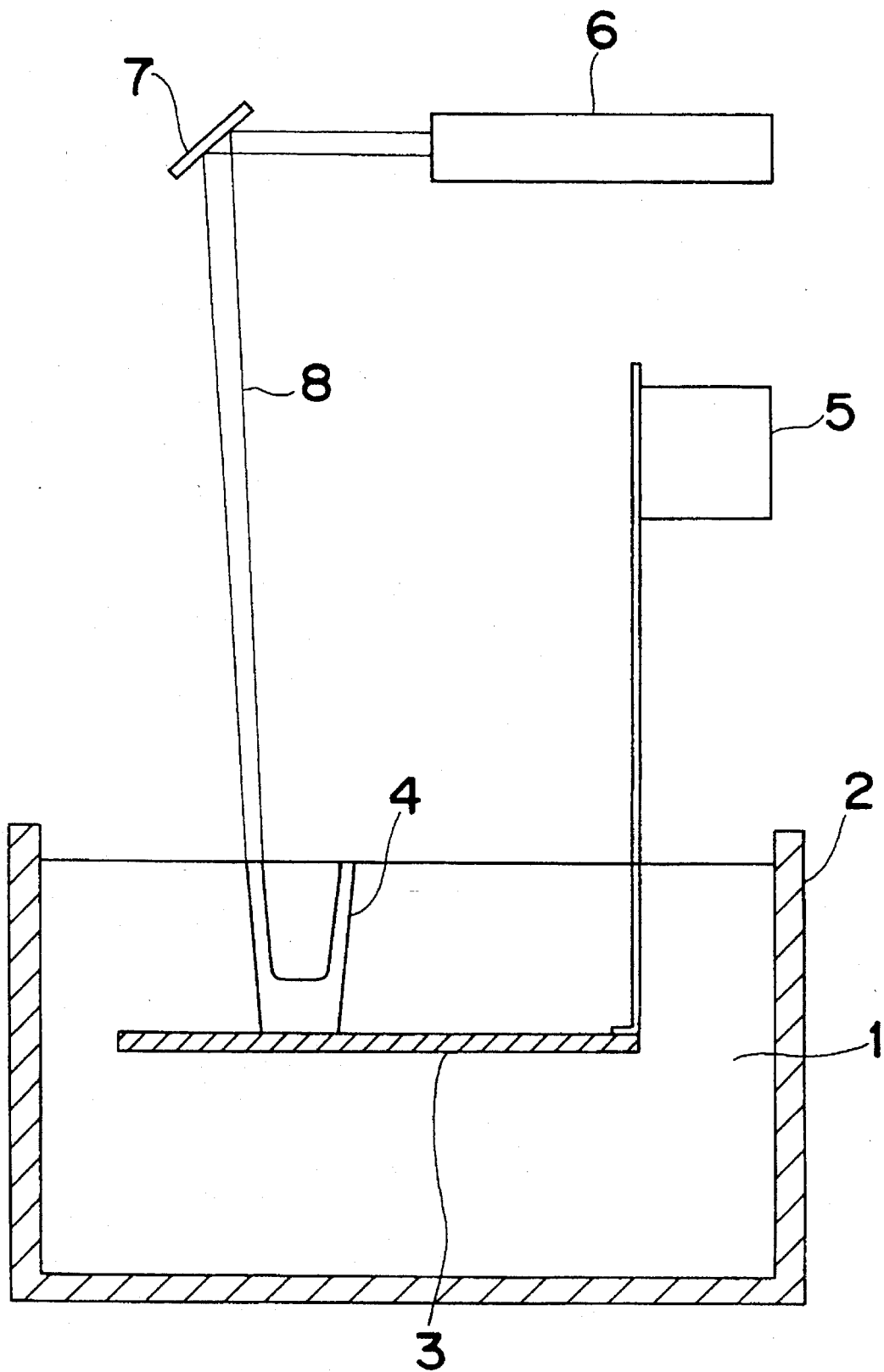
FIG. 6 is a schematic side view of a conventional forming apparatus of a resin article.
Figure 7:
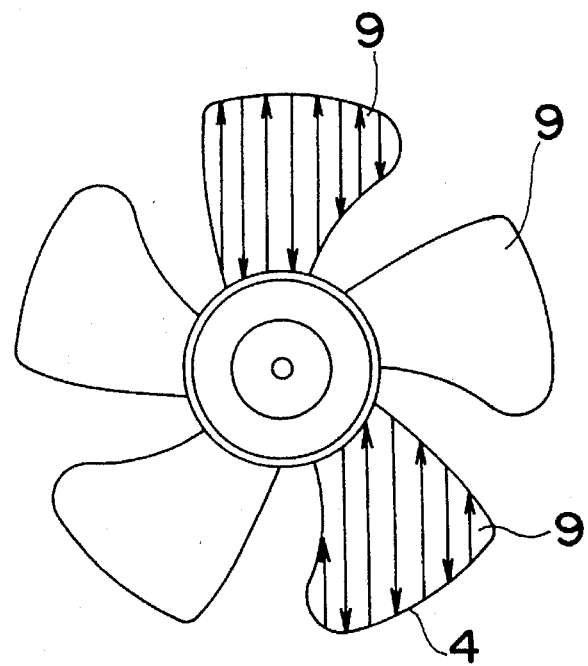
FIG. 7 is an explanatory diagram when a laser beam scans according to a conventional forming method of a resin article.
Figure 8A:
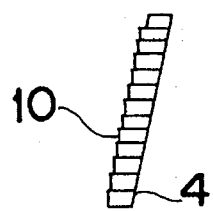
FIGS. 8A and 8B are side sectional views of thin portions of a resin article according to the conventional forming method.
Figure 8B:
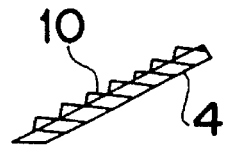
Figure 9:
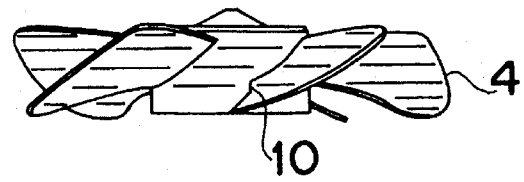
FIG. 9 is a side view of a screw formed in the conventional forming method.

With the application of the above method, a laminated resin article, for instance, a screw of FIG. 5 with many layers laminated as drawn by curves 22 can be efficiently formed with relatively highly accuracy.

The laser beam 20 is scanned along the axis of the workpiece 13 in the foregoing embodiment. On the other hand, the workpiece 13 may be moved in the axial direction thereof without scanning the laser beam by driving devices 30, 40 such as cylinders, or both the laser beam 20 and the workpiece 13 may be continuously or intermittently moved in the axial direction of the workpiece 13 by the laser beam controller 21 and the driving devices 30, 40.

In the embodiments, thermosetting resin liquid can be used instead of the photosetting resin liquid, and at this time, a plasma or electron beam can be applied to the thermosetting resin liquid on the workpiece 13 in order to set the resin liquid. Also, a UV lamp can be used instead of the laser oscillator 19 to set the resin liquid on the workpiece 13.

An example of the photosetting resin is "AdekaLascure HS671" made by Asahi Denka Kabushiki Kaisha. An example of the laser oscillator 19 is an Ar ion laser made by Coherent Co., Ltd. and its output is 400 mW Max (100 mW at forming), its spot diameter (setting width) of the laser beam is 0.1 mm, and the scanning speed is 200 mm/sec. When the workpiece 13 is intermittently rotated, the rotary speed of the workpiece 13 is so determined that the setting width below the liquid surface may be preferably 0.1 mm through the repetition of the rotation of the workpiece 13, the stoppage of the rotation, and the laser scanning. When the laser beam is not moved and the workpiece 13 is continuously rotated, the peripheral speed of the workpiece 13 is 200 mm/sec, preferably.

The range of the laser scanning speed is from 10 mm/sec through 2,000 mm/sec, preferably. If the laser scanning speed is less than 10 mm/sec, the setting depth can not become large because the transmittance of the laser light to the resin has a limitation. If the laser scanning speed is greater than 2,000 mm/sec, effective operation can not be performed because the performance of the galvano mirror has a limitation. When only the resin performance and the laser output are taken into consideration without considering the galvano mirror, the speed can be 10,000 mm/sec.

The range of the spot diameter of the laser beam is 0.02 mm through 2.0 mm, preferably. When the diameter is less than 0.02 mm, it takes much longer time to process the workpiece 13. When the diameter is greater than 2.0 mm, the setting unit of the workpiece 13 is too large and thus the surface roughness of the workpiece 13 becomes too rough.

According to the present invention, since the workpiece is axially rotated with its axis kept in the horizontal direction, it is possible to set a film of photosetting resin liquid by using a laser beam while the film is formed on the surface of the workpiece. The laser beam is scanned in a direction along the axis and in a circumferential direction about the axis, that is, in three dimensions. Therefore, even when a to-be-formed article is like a screw, the article is formed efficiently with high accuracy. Moreover, the thickness of the above film formed on the workpiece is correctable immediately before the film is set, so that a step difference is minimized, and the time and labor consumed for a surfacing process are remarkably reduced.

Although the present invention has been fully described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims unless they depart therefrom.

What is claimed is:

1. A method for forming a resin article by forming a film of photosetting resin liquid or thermosetting resin liquid on a surface of a workpiece, which comprises:

a step of holding the workpiece in a direction to keep its axis approximately in a horizontal posture;

a step of rotating the workpiece about the axis to thereby form the film of the liquid on the surface of the workpiece;

a step of supplying a beam from above the workpiece onto the film for setting the resin liquid;

a step of relatively moving at least one of the workpiece and the beam continuously or intermittently along the axis; and a step of using a smoothing means to regulate a thickness of the film formed on the surface of the workpiece over a liquid bath containing the liquid.

2. The forming method as claimed in claim 1, wherein a direction of the rotation of the workpiece about the axis is periodically changed.

3. The forming method as claimed in claim 1, wherein in the rotating step, when the workpiece is rotated about the axis to thereby form the film of the liquid on the surface of the workpiece, starting points of setting are shifted to prevent residual stress caused on the workpiece from being concentrated at one point.

4. The forming method as claimed in claim 1, wherein in the rotating step, when the workpiece is rotated about the axis to thereby form the film of the liquid on the surface of the workpiece, the workpiece is set inside a liquid bath containing the liquid.

5. The forming method as claimed in claim 1, wherein in the rotating step, when the workpiece is rotated about the axis to thereby form the film of the liquid on the surface of the workpiece, the workpiece is set over a liquid bath containing the liquid.

6. The forming method as claimed in claim 1, wherein in the beam emitting step, the beam is emitted from a laser beam source for setting the photosetting resin liquid, a range of a laser scanning speed of the beam is from 10 mm/sec through 2,000 mm/sec, and a range of a spot diameter of the beam is 0.02 mm through 2.0 mm.

\* \* \* \* \*